United States Patent Office 3,677,888
Patented July 18, 1972

3,677,888
MANUFACTURE OF PAPER USING AMPHOTERIC STRENGTHENING AGENTS
Peter Economou, Bedford, Mass., assignor to American Cyanamid Company, Stamford, Conn.
No Drawing. Continuation-in-part of application Ser. No. 546,214, Apr. 29, 1966. This application July 22, 1969, Ser. No. 843,782
Int. Cl. D21h 3/36
U.S. Cl. 162—164                                                   10 Claims

ABSTRACT OF THE DISCLOSURE

Paper of improved dry strength is obtained when a normally liquid and water-insoluble polysalt coacervate (wherein one of the polymer components is weakly ionic) which has been rendered water-soluble by addition of an ionization suppressor is added to a papermaking fibrous suspension under conditions such that the coacervate is precipitated as colloidal droplets. The droplets are deposited on the fibers, and the fibers are processed into paper in usual manner.

---

This is a continuation-in-part of my copending application Ser. No. 546,214, filed Apr. 29, 1966, now abandoned.

The present invention relates to the manufacture of paper by use of ionically cross-linked three-dimensional water-soluble ionic compositions of amphoteric coacervating liquid polysalts having at least one of their ionic functions suppressed.

Liquid polysalts (also termed "polysalt coacervates") are the peculiar group of polysalts which form when a dilute aqueous solution of an anionic polyelectrolyte is mixed with a dilute aqueous solution of a cationic polyelectrolyte, provided at least one of the polyelectrolytes is weak (i.e., provided that it has an ionization constant less than $10^{-3}$), that the molecular weights are sufficiently high, and that certain pH and concentration limits are met; cm. Ind. Eng. Chem., 57, 32 ff. (October 1965). The liquid polysalts first become apparent to the eye as colloidal droplets which form a haze in the aqueous medium, and in certain instances on standing these droplets spontaneously coalesce or "coacervate" to form a homogeneous viscous fluid phase which contains substantially all of the polysalt which has been formed. It is a further peculiarity of these polysalts that they are soluble in water at moderate to high concentrations (e.g., above about 10% by weight) and become insoluble when the solutions are diluted below about the 10% level with water.

Liquid polysalts generally have a specific gravity greater than 1, and hence the coacervate (i.e. the fluid phase) usually accumulates at the bottom of the reaction flask. If the layer is re-dispersed and the liquid allowed to stand, the droplets sink and the coacervate re-accumulates. The polysalts have definite isoelectric points, which are the pH at which they are electrostatically neutral.

The polysalts are three-dimensional (as necessarily results from the polyfunctionality of the polymers of which they are composed), and they are held together chiefly by ionic forces. It is their great pecularity that, despite their three-dimensional cross-linked structure, they are fluid. They are composed of an anionic polymer (or mixture of anionic polymers) and a cationic polymer (or mixture of cationic polymers) in respective weight ratio between about 5:95 and 95:5, and are ampholytic.

Up to the present, the liquid coacervating polysalts have not found use as beater additives in the manufacture of paper because when so added they have achieved no useful result. The present invention provides a number of methods for the manufacture of strengthened paper by the use of these polysalts.

I have found that paper of increased strength (and in preferred instances greatly increased strength) is obtained when a stock solution of a normally coacervating polysalt of critical composition is added to an aqueous suspension of cellulose papermaking fibers under critical conditions, and the fibrous suspension is processed into paper, as is hereinafter more fully described. I have found that when the critical conditions referred to above are met, the dissolved polysalt in the stock solution almost instantly separates in the form of colloidal droplets in insoluble coacervate state; that when the pH of the fibrous suspension is above the isoelectric point of the polysalt the coacervate droplets are anionic and can be deposited on the fibers by alum and that when the pH of the fibrous suspension is below the isoelectric point of the polysalt the droplets are cationic and self-substantive to the fibers and that paper made from the fibers carrying the polysalt with or without alum possesses substantially improved strength.

I have further found that the polysalt droplets, when cationic, exert their strengthening effect when the fibers have previously been sized with customary amounts of hydrophobic organic material (including rosin size); that the droplets impart wet strength when at least one of the components therein is a wet strength resin; and that superior strengthening is achieved when the polymer is added in metallized state, particularly when the aqueous fibrous suspension, prior to addition of the polysalt, is substantially free from dissolved polyvalent metal ions.

I have thus discovered a novel process for the manufacture of paper of improved dry strength, which consists essentially in forming an aqueous suspension of cellulose papermaking fibers having a consistency between about 0.5% and 5%; adding thereto an effective amount as strengthening agent of an aqueous solution containing (a) about ½ to 5% by weight of an ionically self-cross-linked normally coacervating insoluble liquid empholytic polysalt composed of a normally water-soluble polyanionic polymer and a normally water-soluble polycationic polymer in weight ratio between about 95:5 and 5:95, at least one of said polymers being a weak electrolyte and having an ionization constant less than $10^{-3}$, and (b) sufficient of a water-soluble ionization suppressor compatible therewith to maintain said polysalt soluble in said solution but insufficient to maintain said polysalt soluble when said solution is diluted to 0.1%–0.001% polysalt content with water, the pH of said suspension being at a point at which said polysalt becomes a colloid whereby said polysalt is precipitated in coacervate state as colloidal droplets in said suspension; depositing said droplets on said fibers; forming said fibers into a web; and drying said web on rolls having a temperature between 190° F. and 250° F.

The discovery has further been made that in preferred instances the invention possesses other important advantages, as follows:

(1) The paper possesses greater dry strength than paper made by the use of either of the component resins on an equal weight-for-weight basis. The strengthening effect of the polymers in polysalt state is therefore more than the sum of the strengthening effect of the components applied separately.

(2) The paper can be successfully made at any pH within the papermaking range heretofore employed (including neutrality), depending on the isoelectric point of the polysalt employed. The process thus permits the utilization as anionic and cationic agents, a new class of dry strength agents which can be self-adsorbed by cellulose fibers in aqueous suspension and which consequently do not require the addition of alum or other fixing agent. If desired, the polysalts can be used in established acidic papermaking systems, in conjunction with rosin size or other hydrophobic sizing material.

(3) The process does not require the use of metal, acid, or formaldehyde. The process is thus specially suitable for the production of photographic paper.

(4) The process is flexible and permits the manufacture of strengthened paper over a broad pH range by the use of polymers which heretofore have found application only within a narrow pH range.

The process of the present invention involves four principal critical limitations.

The first critical limitation is the polysalt itself. One of the components of the polysalt (the cationic component or the anionic component) must be a weak polyelectrolyte. If desired, both components may be weak polyelectrolytes. The desired colloid does not form if both the anionic and the cationic components are strong polyelectrolytes.

The second critical limitation is the presence of ionization suppressor in the polysalt solution. The amount of ionization suppressor should be sufficiently large to maintain the polysalt in dissolved state when in aqueous solutions in the range of about ½%–5% polysalt solids by weight, but sufficiently small so that the polysalt precipitates in colloidal coacervate state when the solution is diluted to 0.1%–0.001% with water (as occurs on addition to the papermaking pulp). Too much ionization suppressor prevents formation of the colloid, and premature precipitation occurs when too little ionization suppressor is present.

The third critical limitation is the concentration of polysalt in the solution which is added to the pulp. It should be in the range of about ½%–5% (and preferably 1%–3%) by weight. If outside this range, rapid and uniform production of the colloid throughout the fibrous suspension does not occur when the polysalt solution is added thereto, and the strength of the paper is less than would otherwise be the case.

The fourth critical limitation involves the pH of the polysalt and of the fibrous suspension. The pH of the solution which is added should be such that the polysalt is in molecular solution, so that the solution is clear. The pH of the fibrous suspension should be such that the polysalt separates as a colloidal haze when the solution is added to the fibrous suspension in amount sufficient to impart a strengthening effect and so undergoes extensive dilution.

According to the process of the present invention, an aqueous suspension of cellulose papermaking fibers is prepared at any customary consistency (normally in the range of ½%–5%) and pH (normally in the range between 4 and 9). The fibers may consist of cellulose, but if desired they may carry one of the customary sizing agents (for example rosin size, fortified rosin size, octadecyl ketene dimer, stearic anhydride, octadecyl isocyanate, etc.).

There is then added an aqueous solution of a normally water-soluble polyanionic polymer and a normally water-soluble polycationic polymer (as further defined herein) in 95:5 to 5:95 weight ratio and an ionization suppressor, the two polymers normally forming an ionically self-crosslinked normally coacervating liquid insoluble ampholytic polysalt when in water at 1%–5% polysalt content, the amount of ionization suppressor being within the critical range stated above. Any of the commercially available water-soluble ionic dry and wet strength resins can be used in formulating the polysalts used in the process of the present invention so long as at least one of the resins is a weak polyelectrolyte.

The pH of the solution of the polysalt is such that the solution is clear when added to the fibrous suspension, i.e., the pH is such that no polysalt colloid is present at that time.

The pH of the fibrous suspension to which the polysalt solution is added is such that the polysalt content is released as colloidal droplets when the solution is added to the suspension in sufficient amount to provide a strengthening quantity of the polysalt and so undergoes extensive dilution, typically to 0.1%–0.001% polysalt content.

The process of the present invention depends for its effect upon the formation of an insoluble cationic polysalt coacervate in colloidal state in the presence of the cellulose fibers to be treated. Results are poor when the colloid solution is prepared in advance.

Most papermills operate under substantially constant pH conditions, and accordingly it is often more convenient to adjust the colloid-forming pH of the polysalt to the papermaking system rather than to adjust the pH of the papermaking system to the properties of the polysalt. The pH at which the polysalt forms a colloid on dilution generally can be raised by addition of an appropriate water-soluble cationic polymer thereto, and the pH at which the colloid forms can be depressed by addition of an anionic polymer.

A colloid which is anionic may become cationic if the pH is lowered, and a colloid which is cationic may become anionic if the pH of its aqueous medium is raised. The electrostatic condition of any given polysalt colloid can be determined by the use of an electrophoresis cell. Preferably the pH of the papermaking system is such that the colloid is cationic. In such event alum (though usually beneficial) is not required.

Paper which possesses improved dry strength but substantially no wet strength is obtained by use of polysalts which contain no thermosetting resins.

Paper which possesses wet strength in addition to improved dry strength is obtained by the use of polysalts which contain at least one thermosetting wet strength resin, and when the paper is dried for ¼–3 minutes on drying rolls having surface temperatures in the range of 190°–250° F.

The suitability of any given polysalt solution for use in the process of the present invention can be determined by preparing handsheets in the laboratory, as described herein. Formation of paper of substantially improved dry strength is evidence that the polysalt in the solution used, when added to the pulp in customary amount, separated and formed itself into colloidal coacervate droplets, and that consequently the relationship between the pH of the papermaking suspension and the amount of ionization suppressor in the stock polysalt solution were correct. No general rule so far has been found which permits these relationships to be predetermined.

The process of the present invention is applicable to the principal papermaking cellulose fibrous suspensions, ranging from newsprint to highly refined, highly bleached pulps. The polysalt colloid droplets tolerate the presence of dissolved polyvalent salts in the suspension, but the evidence to date is that the better strengthening effect is achieved (per unit weight of polysalt added) when the aqueous phase of the pulp, prior to addition of the polysalt, is free of polyvalent metal ions and when the polysalt is metallized.

Formation of the polysalt colloid can be observed by adjusting a sample of the fibrous suspension to pH 2, passing a beam of light transversely through the liquid, adding to the water sufficient of a 1% polysalt solution such as is herein described to provide about 0.1% of polysalt based on the weight of the solution, and slowly elevating the pH of the liquid by dropwise addition of aqueous sodium hydroxide. The beam of light becomes sharply outlined as the colloid forms, and then disappears as additional alkali is added.

The point in the papermaking cycle at which the polysalt solution is added is of importance in the process of the present invention. In the case of mills which operate with furnishes which have a pH close to the isoelectric point of the polysalt used, best strengthening effect is generally achieved when the polysalt solution is added to the fibrous suspension at a point in the papermaking operation where the cellulose fibers are no longer subjected to shear forces and when the consistency of the suspension is less than 5%. This minimizes removal of deposited colloid droplets from the fibers, and ensures that the colloid droplets will be uniformly formed throughout the furnish. In most mills the fibrous suspension leaves the fan pump at a consistency of 0.1%–1.5% and hence the polysalt stock solution is advantageously added at this point to the headbox.

It is within the scope of the invention to add pigment prior to, along with or after the polysalt solution. The polysalt acts as retention aid and increases the proportions of pigment retained by the fibers.

After addition of the polysalt solution the fibers in the suspension are converted into paper in any customary manner. Good results are generally obtained when the web is dried on steam-heated rolls having surface temperatures in the range of 190° F.–260° F. The paper may be calendered and coated if desired.

The ionization suppressor which is present in the solution of the present invention is any substantially monomeric water-soluble material which has an ionization constant larger than $10^{-6}$. Preferred ionization suppressors are the strong bases (sodium hydroxide, potassium hydroxide, tetramethyl ammonium hydroxide and ammonium hydroxide); strong acids (sulfuric acid, hydrochloric acid, nitric acid, sulfurious acid, phosphoric acid, and trichloroacetic acid); and the water-soluble highly ionizing salts (sodium sulfate, the sodium phosphates, magnesium sulfate, calcium chloride, sodium chloride, etc.). Since it is preferred to use the complex in cationic state, acids and neutral or acid salts are preferred as the ionization suppressor.

A small amount of the polysalt (e.g., ¼% based on the dry weight of the fibers), in preferred instances produces a significant strengthening action and evidently less may be used to advantage. On the other hand, the strengthening imparted by the complex tends to level off when more than 3%–5% of the polysalt is added (based on the dry weight of the fibers) so that an amount in this range may be regarded as the practical maximum.

Strongly anionic polymers of which the coacervating liquid polysalts may be composed include poly(sulfostyrene), poly(allylsulfonic)acid, sulfonated urea-formaldehyde resin (formed by reacting urea-formaldehyde and sodium metabisulfite as shown in Suen U.S. Pat. No. 2,559,578), the sulfonated methylol acrylamide copolymers of Suen et al. U.S. Pat. No. 2,761,834; the water-soluble half ester of polyvinyl alcohol with sulfuric acid, and the foregoing polymers wherein part of the acid groups are converted to amide state.

Weakly anionic polymers which may be present in coacervating liquid polysalts include polyacrylic acid, polymethacrylic acid, the dimethylol urea-sulfur dioxide condensation products of Maxwell U.S. Pat. No. 2,407,376; hydrolyzed styrene-vinyl acetate-maleic anhydride copolymer (1:2:3 molar ratio); and the 90:10 acrylamide:acrylic acid copolymer.

Strongly cationic polymers which may be present in the coacervating polysalts are those which contain a substantial proportion of strongly cationic substituents such as quaternary ammonium, quaternary phosphonium and quaternary sulfonium substituents, they include poly(p-vinylphenyl trimethyl ammonium bromide), poly(diethylaminoethyl acrylate) quaternized with methyl chloride, polyvinyl pyridine quaternized with ethyl chloride, and the thermosetting polymers prepared by reacting adipic acid with diethylenetriamine in 1:1 molar ratio to form a higher molecular weight water-soluble "backbone" followed by reaction with epichlorohydrin to form a highly quaternized water-soluble thermosetting resin, as is shown in Keim U.S. Pat. No. 2,926,154.

Weakly cationic polymers are, in general, those polymers, the cationic substituents of which are not quaternary ammonium, phosphonium or sulfonium substituents. Weakly cationic polymers thus include polyvinylamine, polyethylenimine, acrylamide-vinylpyridine copolymer, poly(diethylaminoethyl acrylate), the alkylenepolyamine-epichlorohydrin resins of Daniel et al. U.S. Pat. No. 2,595,935, and the amine-ammonia-epichlorohydrin resin and other polymers of Coscia U.S. Pat. No. 3,248,353.

As has been stated, polysalts which are composed of strongly anionic polymers and strongly cationic polymers generally are not liquid and hence are suitable for use in the process of the present invention.

Wet strength paper is obtained when either the anionic or cationic component is a wet strength resin or comprises a wet strength resin, or when both the anionic and cationic components are wet strength resins. The proportion of wet strength resin which should be present in any polysalt composition which also contains one or more than one non-wet strengthening resin can be readily determined by laboratory trial; wet strengthening resins vary widely in efficiency per unit weight, and no general rule has been found for predicting their efficiency in the present invention. The dry strength of paper obtained by use of polysalts which contain no wet-strengthening component increases with the molecular weight of at least one of the polymers in the polysalt, and components having molecular weights in excess of 50,000 are preferred.

Preferred compositions for use in the present invention are the polysalts described above which contain an acid as the ionization suppressor and which are complexed or "metallized" with a polyvalent metal salt such as has previously been employed as agents for fixing rosin size on paper-making fibers. The acidic ionization suppressors are acids which have a pH less than 6 (for example sulfuric acid, phosphoric acid, sulfurious acid, hydrochloric acid, trichloroacetic acid, dichloroacetic acid, formic acid, acetic acid, etc.). The metallizing salts include alum, aluminum chloride, aluminum acetate, aluminum benzoate, aluminum nitrate, ferric sulfate, ceric sulfate, and zirconium sulfate. Formation of the new metallized polysalt occurs almost instantly; the reaction is ionic. The composition may have any desired content of the metallized polysalt. Addition of the polyvalent metal salt causes an increase in the viscosity of the solution, and when the starting solution of the polysalt is viscous, addition of a preferred amount of the polyvalent metal salt may cause the solution to change to a rigid gel. The gel can be comminuted and, surprisingly, dissolves readily in cold water. When the starting solution contains less than about 10% by weight of the polysalt, the solution generally remains of pumpable viscosity after addition of the polyvalent metal salt.

The amount of polyvalent metal salt which should be added in any instance for best fortifying action depends upon the particular salt which is selected and the particular polysalt to which it is added. The optimum amount, however, is readily found by laboratory trial. In general, I have found that the addition of as little as 5% by weight of an aluminum salt to a solution of a polysalt produces a perceptible fortifying action, and that about 30% is about the most that need be added to obtain maximum fortifying effect; weights are based on the aluminum salt in anhydrous state and the weight of solids in the polysalt solution. However, it is often advantageous to add still larger amounts of the polyvalent metal salt, because while these larger amounts cause a decrease in the efficiency of the complexed polysalt, the low cost of the added salts often permits a net saving in the cost of the more expensive polysalt component needed to produce a given level of dry strength. The salts thus act as extenders in addition to acting as fortifying agents.

The polysalt compositions described above (including these compositions when metallized with a polyvalent metal salt) are amphoteric and consequently may be added to paper-making pulps over a broad pH range, the pH of the pulp on addition of the composition being at least ½ and preferably two pH units away from the isoelectric point of the composition (so that the composition possesses adequately strong ionic properties). It is more convenient for the pH of the suspension to be below the isoelectric point of the composition than to be above; when this is the case the composition is cationic with respect to the fibers in the suspension and is directly absorbed by them without need for alum or other fixing agent.

In general, compositions suitable for use in the present invention are conveniently prepared by forming a fluid aqueous solution of a suitable anionic polymer, forming a similar solution of a cationic polymer, adding a suitable ionization suppressor to one of the solutions, and mixing the two solutions. If desired, a polyvalent metal salt may be dissolved in the mixture as fortifying agent. Throughout, the polymers, ionization suppressors and polyvalent metal salts used, and weight ratios, pK and pH values and temperatures employed, should conform to the values set forth above and illustrated by the examples.

Polysalt compositions suitable for use in the present invention are disclosed and claimed in my copending application Ser. No. 843,838 filed herewith.

The invention is further illustrated by the examples which follow. These examples are preferred embodiments of the invention and are not to be construed as limitations thereon.

EXAMPLE 1

The following illustrates the preparation of paper of improved strength by use of a variety of three-dimensional water-soluble ionically self-crosslinked normally coacervating ampholytic polysalts. In each instance the polysalt is prepared by admixture of an aqueous solution of an anionic polymer with an aqueous solution of a cationic polymer in such proportions as supply the polymers in the ratios shown in the table below. The polymers are mixed as solutions at room temperature which contain about the maximum amount of polymer while permitting easy stirrability. In most instances the solutions contain 10%–40% by weight of polymer salts. The ionization suppressor is added to one of the polymer solutions; it is immaterial to which solution the ionization suppressor is added. The particular ionization suppressor which is added and the amount thereof is shown in each instance in the table which follows.

The foregoing polysalts have isoelectric points between about pH 6.5 and 8. The solutions are clear, viscous but easily pumpable fluids which are readily diluted to 2% solids by admixture with cold water.

The resulting solutions are clear and readily dispersible in water. They are respectively added to aqueous suspensions of cellulose paper-making fibers having a pH of 6 in amount sufficient to provide 0.5% of polysalt on the dry weight of fibers. The fibers are sheeted to form wet webs, and the webs are dried on a laboratory drum drier having a surface temperature between 190° F. and 250° F. The resulting papers possess significantly improved dry tensile and burst strength; the papers of runs 10 and 11 possess perceptible wet strength. Typically, the dry strength improvements which are obtained range between 20% and 60% of the strength which are obtained in the absence of the resin.

EXAMPLE 2

The following illustrates the effect of variations in paper-making conditions when a polysalt of the present invention is employed as wet-end additive for the manufacture of paper of improved dry strength.

An aqueous solution of a three-dimensional water-soluble ionically self-crosslinked normally coacervating polysalt is prepared mixing 750 g. of a hot (60° C.) 14% by weight solution of the anionic copolymer of run 1 of Example 1 with 10 g. of 100% $H_2SO_4$ as ionization suppressor, and introducing the mixture with stirring under the surface of 235 g. of a 36% by weight solution of the cationic polymer of run of Example 1. The weight ratio of the two polymers (dry basis) is thus 55:45. The isoelectric point of the polysalt is about 7.8. When homogenous, the solution is adjusted to pH 1.8 by addition of 38% HCl as supplementary ionization suppressor. The resulting polysalt solution contains 19% resin solids and is stable for about a month at 40° C.

Runs 1–4.—These runs illustrate the effect of increasing amounts of the polysalt colloid as strengthening agent for paper. The runs are made on a continuous experimental paper-making machine supplied with a 70:30 bleached hardwood:bleached soft wood kraft pulp at 2% consistency to form paper having a basis weight of 50 lb. per 24" x 40"/500 ream. The pulp is acidified with concentrated sulfuric acid to pH 5.8 and 0.75% alum is added based on the dry weight of the fibers (giving the pulp a pH of 5.5), after which the polysalt solutions are successively added at the headbox as a 2% solution

| | Ionically self cross-linked coacervating ampholytic polysalt | | | | Ionization suppressor | |
|---|---|---|---|---|---|---|
| Run No. | Water-soluble anionic polymer | Water-soluble cationic polymer | Wt. ratio [1] | Type [2] | Name | Percent [3] |
| 1 | Acrylamide: acrylic acid copolymer [4] | Adipic acid-TEPA polymers-epi [5] | 55:45 | W-W | $Na_2SO_4$ | 33 |
| 2 | do | do | 55:45 | W-W | NaCl | 45 |
| 3 | do | do | 55:45 | W-W | $Na_2HPO_4$ | 25 |
| 4 | do | do | 55:45 | W-W | $H_2SO_4$ | 5 |
| 5 | do | Methylamine-ammonia-epi [6] | 55:45 | W-W | $MgSO_4$ | 33 |
| 6 | do | do | 55:45 | W-W | $CaCl_2$ | 45 |
| 7 | do | do | 55:45 | W-W | $KH_2PO_4$ | 25 |
| 8 | do | do | 55:45 | W-W | $Cl_3COOH$ | 5 |
| 9 | do | Diethylene triamine-epi [8] | 55:45 | W-W | HCl | 5 |
| 10 | do | do | 55:45 | W-W | $CCl_3COOK$ | 45 |
| 11 | Acrylamide:styrene-maleic anh. copol. [7] | Methylamine-ammonium-epi [6] | 50:50 | W-W | $H_2SO_4$ | 6 |
| 12 | Acrylamide:acrylic acid copol. [4] | Polacrylamide-ethylenediamine [9] | 80:20 | W-W | $Na_2SO_4$ | 10 [25] |
| 13 | Casein (as sodium salt) | Adipic acid-TEPA polymer-epi [5] | 70:30 | W-W | NaCl | 40 |
| 14 | Acrylamide-acrylic acid copol. [4] | Acrylamide-DMP + DMS [11] | 50:50 | W-S | $ZnCl_2$ | 33 |
| 15 | do | Acrylamide-acrylic acid-DADMAC [12] | 15:85 | W-S | $H_2SO_4$ | 6 |
| 16 | do | Poly(vinylbenzyl trimethyl ammonium chloride) | 70:30 | W-S | $H_3PO_4$ | 33 |
| 17 | Acrylamide alysulfonic acid [13] | Poly(diethylaminoethylacrylate) | 50:50 | S-W | $(NH_4)_2SO_4$ | 35 |
| 18 | Poly(sulfomethyleneacrylamide) [14] | Polyethylenimide [15] | 60:40 | S-W | $Na_2HPO_4$ | 25 |
| 19 | Sulfonated polystrene [16] | Diethylenetriamine-epi [8] | 20:80 | S-W | $MgSO_4$ | 35 |

[1] Of anionic polymer to cationic polymer.
[2] Based on the pK values of anionic polymer and cationic polymer. W-W means that both are weak; S-W means that the anionic polymer is strong and that the cationic polymer is weak, and W-S means the reverse of the foregoing. A polymer having a pK value below about 2 is regarded as "strong" for this classification.
[3] Based on the weight of the polysalt (the combined weights of the anionic and the cationic polymers).
[4] 90:10 molar ratio; molecular weight approx. 400,000.
[5] Prepared by reacting 0.3 mol of epichlorohydrin with a 1:1 molar ratio adipic acid with tetraethylenepentamine condensate to form a water-soluble non-thermosetting product. Molecular weight=approximately 10,000–25,000.
[6] Prepared by condensing the reagents in 1.2:0.2:1.6 molar ratio to the point of incipient gelation.
[7] 40:45:15 molar ratio: molecular weight approx. 200,000.
[8] 1:3 molar ratio, condensed to the point of incipient gelation.
[9] Prepared by heating 7 parts by weight of polyacrylamide with 42 parts of ethylenediamine to a point close to just short of the gel state.
[10] Plus 2% of 100% $H_2SO_4$.
[11] 90:10 acrylamide:dimethylpyridine copolymer quaternized with dimethyl sulfate.
[12] 94:2:4 acrylamide:acrylic acid:diallyl dimethyl ammonium chloride copolymer; molecular weight 750,000.
[13] Approximately 1 sulfur group per phenyl group; molecular weight 400,000.
[14] Prepared by reacting polyacrylamide with formaldehyde and sodium bisulfite (1:1:1 molar ratio) in aqueous solution.
[15] Molecular weight approximately 50,000.
[16] Approximately 1 sulfo group per phenyl group; molecular weight approximately 400,000.

in amount sufficient to provide amounts of the polysalts as shown in the table below. Two seconds elapse while the solutions are being mixed into the pulp, which then has a consistency of 0.6%.

Runs 5–9.—These runs illustrate the effect of changes in the pH of the fibrous suspensions. They are made in the laboratory by adding 0.5% (based on the dry weight of the fibers) of the polysalt solution to an aqueous suspension of 50:50 bleached hardwood:bleached softwood kraft pulp at pH 6 and a consistency of 0.6%, adjusting the pH of the suspension with concentrated HCl or NaOH to the values shown in the table below, sheeting the suspension to form a wet web, and drying the web for 1 minute on a drum drier having a drum temperature of 240° F. The paper has a basis weight of 100 lb.

Runs 10–16.—The effect of alum is illustrated by repetition of the procedure of runs 5–9 except that alum in amounts in the table below is added prior to addition of the polysalt solution, the amount of solution which is added is constant, and the pH of the suspension is adjusted to 5.5 after addition of the solution.

Results are as follows.

| Run No. | Percent alum added [1] | Percent polysalt [2] added | Final pH of suspension | Dry strength [3] Found, lb./in.$^2$ | Percent incr. |
|---|---|---|---|---|---|
| 1 | 0.5 | None | 5.5 | 23 | |
| 2 | 0.5 | 0.2 | 5.5 | 29.5 | 28 |
| 3 | 0.5 | 0.4 | 5.5 | 35.0 | 52 |
| 4 | 0.5 | 0.6 | 5.5 | 37.0 | 61 |
| 5 | | None | 6.0 | 48 | |
| 6 | | 0.5 | 5.5 | 65 | 35 |
| 7 | | 0.5 | 6.0 | 64 | 33 |
| 8 | | 0.5 | 6.5 | 60 | 25 |
| 9 | | 0.5 | 7.0 | 57 | 19 |
| 10 | None | None | 5.5 | 53 | |
| 11 | None | 0.5 | 5.5 | 73 | 38 |
| 12 | 0.1 | 0.5 | 5.5 | 78 | 47 |
| 13 | 0.3 | 0.5 | 5.5 | 81 | 53 |
| 14 | 0.5 | 0.5 | 5.5 | 82 | 55 |
| 15 | 1.0 | 0.5 | 5.5 | 80 | 51 |
| 16 | 1.5 | 0.5 | 5.5 | 79 | 49 |
| 17 | 2.0 | 0.5 | 5.5 | 78 | 47 |

[1] Based on dry weight of fibers.
[2] Polymer content of solution based on dry weight of the fibers.
[3] By Mullen (burst) test.

The results show that pre-treatment of the fibers with alum increases by about 10% the dry strength imparted by the polysalt complex. From other work it is known that the maximum improvement does not always result from the addition of 0.3% alum, but that in certain instances, evidently depending on the character of the pulp, the optimum effect is produced by the use of larger or smaller amounts.

EXAMPLE 3

The following illustrates the manufacture of paper by use of coacervate colloids obtained from two polysalts which differ only in the molecular weights of the anionic resin components of these polysalts.

Polysalt 1.—A polysalt is prepared by taking 55 g. of a 25% by weight solution of an anionic 90:10 acrylamide: acrylic acid copolymer having a molecular weight of about 400,000, adding 2.5 g. of 100% sulfuric acid thereto, and mixing the resulting solution with 45 g. of a 25% by weight solution of the adipic acid-tetraethylenepentamine-epichlorohydrin condensate of footnote 5 of Example 1. The product is a crystal clear, transparent solution which remains stable for more than three months at 40° C.

Polysalt 2.—The procedure for the preparation of polysalt 1 is repeated except that the molecular weight of the anionic copolymer is approximately 5,000,000. The isoelectric points of the two polysalts are substantially the same (about pH 7.8).

The two solutions are tested to determine their respective efficiencies as dry strength agents for paper and as flocculating agents for paper fines by pretreating a 50:50 bleached hardwood:bleached softwood kraft pulp at 0.6% consistency beaten to a Canadian standard process of 410 cc. with 0.5% alum, dividing the pulp into aliquots, adding the solutions (diluted to 2% solids) to provide polysalt in the amount shown in the table below, adjusting the pH of the aliquots to 6.0, determining the Canadian standard freeness of the aliquots, forming the pulps into handsheets, and determining the Mullen dry strength of handsheets, as shown in Example 2 (runs 5–8). Results are as follows.

| | Polysalt | | Pulp flocculation [2] | | Paper dry strength [3] | |
|---|---|---|---|---|---|---|
| Run No. | Molec. weight [1] | Percent added | Found, cc. | Percent incr. | Found, lb./in.$^2$ | Percent incr. |
| 1 | Control | None | 410 | | 45 | |
| 2 | 400,000 | 0.2 | 450 | 7.3 | 57 | 27 |
| 3 | 400,000 | 0.5 | 500 | 22.0 | 70 | 55 |
| 4 | 5,000,000 | 0.2 | 680 | 66.0 | 54 | 20 |
| 5 | 5,000,000 | 0.5 | 690 | 68.2 | 65 | 44 |

[1] Of anionic component.
[2] Canadian standard freeness. The higher the volume (cc.) of water which is released by the pulp, the greater the flocculation of the pulp.
[3] By Mullen test (burst).

Comparison of the results of run 2 with the results of the control run and run 4, and comparison of the results of run 3 with the results of the control run and run 5, show that the low molecular weight polymer produced comparatively little flocculation of the pulp but caused a major strengthening effect, whereas the high molecular weight polymer produced the greatest amount of flocculation but a comparatively little improvement in dry strength.

EXAMPLE 4

The following illustrates the manufacture of wet-strength paper by the use of a polysalt which comprises a wet-strength thermosetting polyamine.

The procedure of run 4 of Example 1 is repeated except that the sulfuric acid used as ionization suppressor is replaced by an equal amount of HCl, and the cationic polymer is replaced by a 14.5% by weight solution of the water-soluble thermosetting wet-strength cationic polymer prepared by reacting a water-soluble 1:1 adipic acid:diethylenetriamine condensate (a polyamidopolyamine) with 1.2 mols of epichlorohydrin to the extent of one of its functionalities. The 55:45 weight ratio solution of the anionic acrylamide:acrylic acid copolymer and the cationic polyamine, containing the ionization suppressor, is clear at 20% solids by weight and remains clear when diluted to 2% solids by weight, but forms a haze when diluted to 0.01% solids at pH 6.

Wet-strength paper towelling is manufactured by forming an aqueous suspension of cellulose papermaking fibers at a consistency of 0.6% and pH 6 (the suspension being free from dissolved polyvalent metal ions), adding thereto sufficient of the above polysalt solution to supply 1% of polysalt based on the dry weight of the fibers, forming handsheets at 50 lb. basis weight, and drying the handsheets for 1 minute on a laboratory drum drier having a drum temperature of 240° F. The sheets possess good wet strength.

EXAMPLE 5

The following illustrates the manufacture of hard sized wet strength paper by the use of a polysalt and a chemical size.

The procedure of Example 4 is repeated except that prior to addition of the polysalt there is added a 2% by weight anionic dispersion of stearic anhydride (formed by emulsifying stearic anhydride at 95° C. in the presence of a trace of sodium stearate as emulsifying agent followed by homogenization and rapid chilling) in amount sufficient to provide 0.5% of the anhydride based on the dry weight of the fibers.

The resulting paper is well sized and possesses good wet strength.

EXAMPLE 6

The foregoing example illustrates the proportions of hard sized wet strength paper using a higher alkyl ketene dimer as the sizing agent and a cationic urea-formaldehyde wet strength resin.

The procedure of Example 5 is repeated except that the thermosetting component of the polysalt is a water-soluble cationic thermosetting urea-formaldehyde-triethylenetetramine resin and the size is a 2% by weight anioic dispersion of hexadecyl ketene dimer prepared in the same manner.

Well-sized paper of good wet strength is obtained.

EXAMPLE 7

The following illustrates a continuous process for the manufacture of paper wherein the pulp is continuously supplied with a dilute aqueous solution of a polysalt according to claim 1 suitable for use in a commercial papermaking machine.

A day tank is nearly filled with water. To this tank is added 10% based on the weight of water of a 90:10 acrylamide:acrylic acid copolymer having a molecular weight of 400,000 and sufficient sulfuric acid to decrease the pH of the polymer solution to 3.5. Into a similar tank is charged a 50% by weight solution at pH 3.0 of the water-soluble substantially non-thermosetting product formed by condensing 1 mol of methylamine, 0.2 mol of ammonia and 1.6 mols of epichlorohydrin to the point of incipient gelation. The solution in each tank is pumped through a metering pump where it is diluted to 5% solids with water. The two resulting streams are combined at a siamese and the resulting single stream is supplied to the headbox of a papermaking machine at such rate as to supply 0.5% of the polysalt solution (solids based on the dry weight of the fibers). At the point of addition the pH of the paper-making fibrous suspension is adjusted to 6.

The dry strength of the paper is much better than the dry strength of similar paper made by addition of 0.5% of the acrylamide-acrylic acid copolymer and alum or by addition of 0.5% of the cationic resin.

EXAMPLE 8

The following illustrates the manufacture of paper by use of a metallized amphoteric polysalt having one of its ionic functions substantially completely suppressed which has been drum-dried and then re-dissolved in water. Results are shown in comparison with the paper prepared by use of this polysalt as dry strength agent against its parent polysalt when employed on fibers that have (and have not been) pre-treated with alum.

A 19% polysalt solution prepared according to Example 2 is divided into two portions. The amount of sulfuric and hydrochloric acid is sufficient to suppress substantially all of the ionization of the carboxylic substituents of the acrylamide-acrylic acid copolymer content of the polysalt, so that the polysalt is present in cationic state.

One portion is retained as control and to this nothing is added. This portion ("unmetallized") is used to make a series of runs to illustrate the effect of the polysalt in unmetallized state. To the other portion is added 20% papermaker's alum [$Al_2(SO_4)_3 \cdot 14H_2O$], based on the weight of polysalt in the solution. A pronounced rise in viscosity occurs at once resulting from formation of an aluminum complex of the polysalt. This portion ("metallized") is dried on a laboratory drum drier having a drum temperature of 220° F. Flakes are obtained which are storage-stable and which can be readily crushed to a free-flowing powder. The resulting powder dissolves readily in water at 20° C. The resulting regenerated solution is used to show the strengthening effect of the polysalt in polyvalent metal complexed state.

A series of dry strength paper handsheets is prepared by standard laboratory procedure which comprises forming an aqueous suspension of well-beaten 50:50 bleached hardwood: bleached sulfate kraft paper-making fibers at consistency of 0.6%, removing aliquots from the suspension, adding the solution in amount sufficient in each instance to provide 0.5% of the polysalt based on the dry weight of the fibers, adjusting the pH of the suspensions to 5.5, sheeting the suspensions to provide handsheets of dry basis weight of 100 lb. per 25" x 40"/500 ream, drying the handsheets on a laboratory drum drier having a drum temperature of 240° F., and determining the Mullen dry strength of the resulting paper.

A second series of handsheets is prepared by the same method except that 1 minute prior to addition of the strengthening agent alum is added to the fibrous suspensions in amounts shown in the table below.

| Run No. | Percent alum added [1] | Dry strength,[2] lb./in. Polysalt unmetallized [3] | Dry strength,[2] lb./in. Polysalt metallized [3][4] |
|---|---|---|---|
| 1 | None | 53 | 53 |
| 2 | None | 73 | 89 |
| 3 | 0.1 | 78 | 88 |
| 4 | 0.3 | 81 | 87 |
| 5 | 0.5 | 82 | 86 |
| 6 | 1.0 | 80 | 84 |
| 7 | 1.5 | 79 | 82 |
| 8 | 2.0 | 78 | 81 |

[1] Based on dry weight of the fibers. When added, the alum is added prior to the polysalt to pretreat the fibers.
[2] Mullen.
[3] Contains ionization suppressor.
[4] Contains 20% by weight of aluminum sulfate tetradecyl hydrate.

The results show that best results are obtained when the polysalt is added in metallized state and when the fibrous suspension, prior to the addition of the metallized polysalt, is substantially free from polyvalent metal ions. The results also show that a significant improvement is obtained when the fibers are pre-treated with alum and when the polysalt is added in unmetallized state.

EXAMPLE 9

The following illustrates the manufacture of paper by use of a polysalt coacervate containing a very strong cationic polymer.

To 100 g. of a 25% by weight solution of poly(p-vinyl-phenyltrimethyl ammonium chloride) is added 100 g. of a 25% by weight solution of a 90:10 molar ratio acrylamide: acrylic acid copolymer. A clear solution results.

A sample of the solution is adjusted to pH 3 by addition of concentrated HCl as ionization suppressor and the solution is diluted slowly to 1% solids, the pH being maintained at 3 by additional increments of HCl. No haze forms. A sample is then diluted to 0.001% solids by addition of water of pH 8. A haze immediately forms which is shown to be colloidal by electrophesis test.

Sufficient of the 1% solution is added to an aqueous suspension of cellulose papermaking fibers having a $3 \times 10^{-3}$ N content of alum as $Al_2(SO_4)_3$ at pH 6.2, after which the fibers are formed into handsheets and drum dried at 240° F. The paper possesses improved dry strength.

EXAMPLE 10

The following illustrates the pH values at which formation of coacervate occurs when clear acid solutions of polysalts of different isoelectric point are titrated with alkali, and the pH values at which the coacervate phase disappears when addition of alkali is continued.

A series of polysalt solutions is prepared at about 20% solids content by admixture of a solution of a water-soluble non-thermosetting cationic resin (prepared by reacting to the point of incipient gelation 0.3 mol of epichlorohydrin with a water-soluble polyamidepolyamine formed by reacting adipic acid and tetraethylenepentamine in 1:1 molar ratio) with an aqueous solution of a 90:10 molar ratio anionic acrylamide:acrylic acid copolymer, in the weight ratios shown in the table below. Sufficient hydrochloric acid is added as ionization suppressor to adjust to pH of each of the solutions to 2, after which the samples are diluted to 0.01% polysalt content with water having a pH of 3. The resulting solutions are clear because of the presence of ionization suppressor in excess over the amount normally added.

Dilute sodium hydroxide is then slowly added with gentle stirring to each of the solutions and the pH threshold is noted at which formation of colloidal droplets of the polysalt coacervate occurs and then the pH at which the coacervate disappears. The isoelectric point is taken in each instance as the point of maximum turbidity. At pH values below the isoelectric point the colloid particles are cationic, and they are anionic at pH values above the isoelectric point.

Results are as follows.

| Composition of polysalt by weight | | Polysalt isoelectric point, pH | Coacervate colloid, pH | |
|---|---|---|---|---|
| Cationic | Anionic | | Appearance | Disappearance |
| 1 | 9 | 3.3 | 3.3 | 4.6 |
| 2 | 8 | 4.4 | 3.3 | 6.1 |
| 3 | 7 | 5.4 | 3.7 | 7.5 |
| 4 | 6 | 6.4 | 4.7 | 8.4 |
| 5 | 5 | 7.4 | 5.5 | 8.5 |
| 6 | 4 | 8.0 | 6.0 | 8.9 |
| 7 | 3 | 8.6 | 6.8 | 9.4 |
| 8 | 2 | 9.1 | 7.9 | 9.6 |
| 9 | 1 | 9.5 | 8.6 | |

Paper of best strength is usually obtained in each instance when the pH of the pulp is at the point where the colloid makes its appearance, when the pH of the pulp is at (or slightly above) the lower of the two values in each of the pairs shown above.

I claim:

1. Process for the manufacture of paper of improved dry strength, which consists essentially in: forming an aqueous suspension of cellulose papermaking fibers having a consistency between about 0.5% and 5%; adding thereto an effective amount as strengthening agent of an aqueous solution containing (a) about ½% to 5% by weight of an ionically self-crosslinked normally coacervating insoluble liquid ampholytic polysalt composed of normally water-soluble liquid polyanionic polymer and a normally water-soluble polycationic polymer in weight ratio between about 95:5 and 5:95, at least one of said polymers being a weak electrolyte and having an ionization constant less than $10^{-3}$, and (b) sufficient of a water-soluble ionization suppressor compatible therewith to maintain said polysalt soluble in said solution but insufficient to maintain said polysalt soluble when said solution is diluted to 0.1%–0.001% polysalt content with water, the pH of said suspension being at a point at which said polysalt becomes a colloid whereby said polysalt is precipitated in coacervate state as colloidal droplets in said suspension; depositing said droplets on said fibers; forming said fibers into a web; and drying said web on rolls having a temperature between 190° F. and 250° F., said ionization suppressor being a substantially monomeric material which has an ionization constant larger than $10^{-6}$.

2. A process according to claim 1 wherein the fibers in the suspension to which the polysalt solution is added carry hydrophobic organic sizing material.

3. A process according to claim 2 wherein the sizing material is rosin size.

4. A process according to claim 2 wherein the sizing material is a hydrophobic cellulose-reactive fatty anhydride and said polysalt comprises a polyamine.

5. A process according to claim 1 wherein the pH of the fibrous suspension after addition of the polysalt solution is below the isoelectric point of said polysalt.

6. A process according to claim 1 wherein at least one of the polymers of which the polysalt is composed is a wet strength resin.

7. A process according to claim 1 wherein the fibrous suspension to which the polysalt solution is added has a pH between 4 and 7 and contains 0.1% to 2% of alum based on the dry weight of the fibers.

8. A process according to claim 1 wherein the web is formed within 10 seconds after addition of the polysalt solution.

9. A process according to claim 1 wherein the polysalt in the solution is metallized with aluminum sulfate.

10. A process according to claim 1 wherein the pH of the fibrous suspension is at about the threshold value for formation of said coacervate.

References Cited

UNITED STATES PATENTS

| | | | |
|---|---|---|---|
| 3,049,469 | 8/1962 | Davison | 162—164 |
| 3,146,157 | 8/1964 | Morgan et al. | 162—164 |
| 3,224,986 | 12/1965 | Butler et al. | 260—857 X |
| 3,332,834 | 7/1967 | Reynolds | 162—164 |
| 3,334,072 | 8/1967 | Sellet | 162—164 X |
| 3,340,237 | 9/1967 | Sellet | 162—164 X |
| 3,384,536 | 5/1968 | Sandberg et al. | 162—164 X |
| 3,409,500 | 11/1968 | Strazdins et al. | 162—179 X |

S. LEON BASHORE, Primary Examiner

F. FREI, Assistant Examiner

U.S. Cl. X.R.

162—168, 179, 180

UNITED STATES PATENT OFFICE
CERTIFICATE OF CORRECTION

Patent No. 3,677,888          Dated July 18, 1972

Inventor(s) Peter Economou

It is certified that error appears in the above-identified patent and that said Letters Patent are hereby corrected as shown below:

Column 1, line 41, "cm." should read -- cf. --. Column 2, line 39, "empholytic" should read -- ampholytic --. Column 5, line 29, "sulfurious" should read -- sulfurous --. Column 6, lines 35, "pH" should read -- pK --. Column 7, line 10, "absorbed" should read -- adsorbed --. Columns 7 and 8, Run No. 12 in the table, under the heading Water-soluble cationic polymer "polacrylamide" should read -- polyacrylamide --; Columns 7 and 8, Run No. 12 in the table, under the heading Percent$^3$ "$10^{25}$" should read -- $25 \times 10^{10}$ --; Columns 7 and 8, Run No. 17 in the table, under the heading Water-soluble anionic polymer "alysulfonic" should read -- allylsulfonic --; Columns 7 and 8, Run No. 18 in the table, under the heading Water-soluble cationic polymer "polyethylenimide" should read -- Polyethylenimine --; Columns 7 and 8, Run No. 19 in the table, under the heading Water-soluble anionic polymer "polystrene" should read -- polystyrene --. Column 8, footnote 10, "H$_2$SO$_4$" should read -- H$_2$SO$_4$ --. Column 11, line 7, "anioic" should read -- anionic --. Column 14, line 30, after "metallized" insert the words -- by reaction --.

Signed and sealed this 12th day of December 1972.

(SEAL)
Attest:

EDWARD M. FLETCHER, JR.                ROBERT GOTTSCHALK
Attesting Officer                       Commissioner of Patents